United States Patent [19]
Cutler

[11] 3,725,916
[45] Apr. 3, 1973

[54] POST STORAGE RANGE AND DOPPLER CORRELATION METHOD AND APPARATUS

[75] Inventor: Thomas P. Cutler, Chestnut Hill, Mass.

[73] Assignee: Sanders Associates, Inc., Nashua, N.H.

[22] Filed: Sept. 1, 1967

[21] Appl. No.: 665,069

[52] U.S. Cl............343/5 DP, 235/181, 343/100 CL
[51] Int. Cl.........G01s 9/02, G06f 15/34, G06g 7/19
[58] Field of Search............................343/5 DP, 343/17.2 DC, 100.7, 17.1, 235/150.53, 181

[56] References Cited

UNITED STATES PATENTS

| | | |
|---|---|---|
| 3,208,065 | 9/1965 | Gutleber et al....................343/100.7 |
| 3,217,324 | 11/1965 | Adamsbaum et al..........343/17.2 PC |
| 3,221,159 | 11/1965 | Cook et al............................235/181 |
| 3,355,579 | 11/1967 | Robertson..........................343/100.7 |

*Primary Examiner*—Malcolm F. Hubler
*Attorney*—Louis Etlinger and Richard I. Seligman

[57] ABSTRACT

Apparatus is herein disclosed for processing signals by storing and correlating with preset programs. The apparatus is disclosed as it relates to a pulse doppler radar application. Target reflected coded signals modulated by doppler are partly correlated to resolve ranges which are ambiguous with relation to the remaining uncorrelated code. The partly correlated signal is stored in a magnetic core matrix. A series of stitching networks wired (or stitched) in accordance with predetermined range and doppler combinations are coupled to the storage matrix so that when the signals stored in the matrix are read out to the stitch networks, correlation of the remaining ambiguity will occur indicating unambiguous range and doppler of targets. The stitch networks compare the stored code time histories with the preset codes representing a combined range and doppler signal.

20 Claims, 1 Drawing Figure

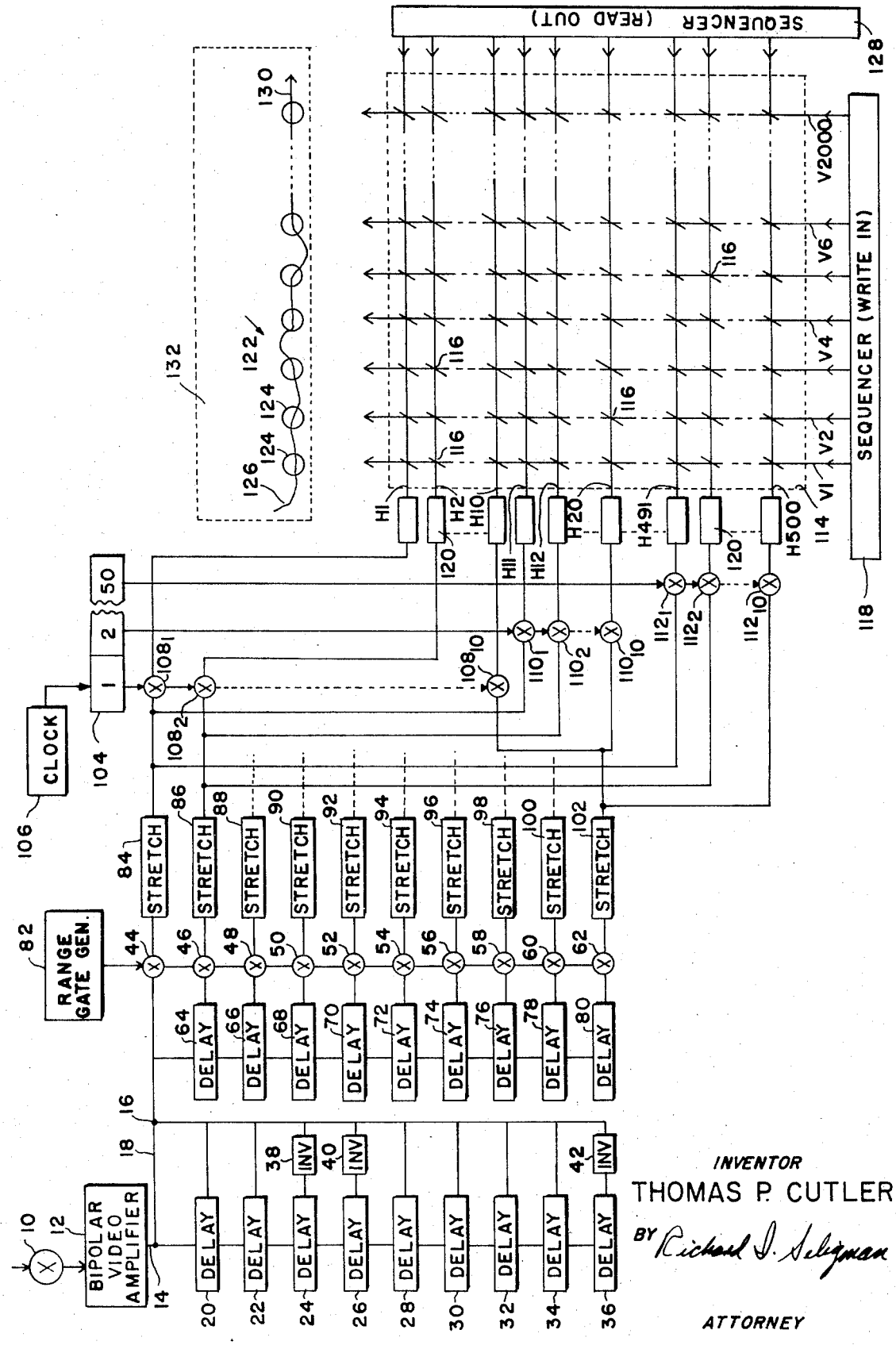

POST STORAGE RANGE AND DOPPLER CORRELATION METHOD AND APPARATUS

BACKGROUND OF THE INVENTION

At the present time high resolution pulse doppler radars using coded signals employ phase inversion switches to correlate the range of a received signal against a delayed sample of the transmitted code and a digital doppler processor to correlate the doppler of the received signal with several selected sample doppler bands.

After resolving range, samples of the doppler modulated signals are stored in a magnetic core matrix and then delivered to a correlator comprising a number of summing networks, each arranged to signify the presence of a particular signal (herein being a particular doppler frequency).

Employing this arrangement requires a multitude of components, particularly in resolving range. Furthermore, with such a system, maximum efficient utilization of the bits reflected from a target does not occur.

SUMMARY OF THE INVENTION

The present invention comprehends a system in which to effect a correlation of a multiplicity of bits of data. The system reduces the multiplication of bits to the equivalent of a single bit by compressing them at a high correlation gain.

For explanation purposes, the invention is disclosed herein as it is applied to pulse doppler radar techniques. In an exemplary pulse doppler radar arrangement, the signal transmitted is composed of three pseudorandom codes. If desirable two codes or more than three codes could be utilized. The first code is a high speed code containing 10 bits at a 100 megacycle rate, each bit being 10 nanoseconds long, which is equivalent to 5 feet in range. Thus, each bit is a 5-foot range gate. Having 10 bits in the code permits resolving range to 5 feet within 50 feet.

The second code or intermediate speed code modulates the first code and contains 50 bits and permits resolving range to 50 feet within 2,500 feet.

The third code or low speed code modulates the resultant code and contains 240 bits and permits resolving range to 2,500 feet within 100 miles.

Each bit of the received code, when reflected from a target, has in its amplitude, frequency and phase, one element of information concerning the range and doppler of that target. It is, therefore, feasible to correlate a target return utilizing a correlation code that is modified from the transmitted code by time delay for range, and by phase inversion at the proper intervals for the doppler effect on the code. This type of correlator will give a large pulse for the correct signal (in range, doppler, and doppler phase) and noise for all other targets at different ranges and dopplers.

One implementation of a range and doppler correlation is achieved by utilizing the orthogonal storage core matrix disclosed in a patent application for "Signal Correlation Apparatus," Ser. No. 486,140 filed Sept. 9, 1965, now U.S. Pat. No. 3,496,544. The orthogonal core matrix is utilized in a two-dimensional sense to store histories of the code in time to read it out into a preset correlating matrix that compares the code time histories with preset codes each of which represents a combined range and doppler signal.

The first or high speed code is compressed and fed to 10 range gates having different delays such that each has 10:1 correlation gain on targets in the gate. Since this code repeats itself, targets in the gate are ambiguous every 100 nanoseconds or 50 feet. The second code then modulates the first code in 100 nanosecond intervals and the third code modulates the second in 5,000 nanosecond intervals. This code must be continued for a duration of at least 500 bits as it must last 10 milliseconds in order to recover desired 100-cycle bandwidth doppler signals. Since the unambiguous range required of the code was 100 miles, the code needed to be only 240 bits long. To meet the bandwidth requirement it could be increased to 500 bits or repeated 2 1/12 times.

The outputs of the range gates are stretched, and fed into the orthogonal core matrix (which in the instant example can comprise 2,000 vertical lines) on separate horizontal lines. The 2,000 vertical lines are pulsed at a 200 kc rate (the third code rate) and the received code is read into the matrix in 10 milliseconds. Now each range line (horizontal) may have a target whose range is known in any 2,500-foot interval, but the specific interval in which it is contained is ambiguous. If the output correlating matrix is set for the range code of the first interval plus all its doppler combinations, targets in the first interval will be indicated as their range line is pulsed in the read-out cycle.

If the maximum range desired is 100 miles or roughly 600,000 feet there will be two hundred forty 2,500 feet ambiguous intervals, and for each interval there will be a different set of range and doppler code stitchings in the correlator network. The horizontal fine range lines are read out sequentially into proportional cores through which the range and doppler codes are stitched. If there are 100 doppler codes per range code, 100 stitchings will be required to handle each range interval, and 100 × 240 or 24,000 stitchings will cover all ranges and dopplers from 0 – 100 miles.

To cover 100 miles using present high resolution pulse doppler techniques would require 120,000 range lines with phase switches, amplifier and limiters instead of 500 and a DDP with 36,000,000 cores instead of 1,000,000 cores.

The advantages for the system are one, a significant increase in the dynamic range of the system in its ability to separate targets from clutter by doppler, and two, a much more efficient method of utilizing the information inherent in a sequency of binary bits that have been reflected by a target.

Accordingly, it is an object of this invention to provide an improved high resolution pulse doppler radar processor.

It is another object of this invention to provide a processor having improved dynamic range in its ability to detect desired signals at the same range as larger unwanted signals by doppler separation.

It is yet another object of this invention to provide a processor capable of very rapidly examining many possible ranges and dopplers for targets.

It is a further object of this invention to provide a digital correlator having more efficient component use.

It is a still further object of this invention to provide apparatus for correlating range and doppler simultaneously in an orthogonal core matrix.

BRIEF DESCRIPTION OF THE DRAWINGS

The above-mentioned and other features and objects of this invention will become more apparent by reference to the following description, taken in conjunction with the accompanying drawing which is a block diagram of a range and doppler processor including an orthogonal core storage matrix and a range and doppler correlator.

DESCRIPTION OF A PREFERRED EMBODIMENT

In a typical pulse doppler radar system, the transmitted signal comprises a coded signal made up of three pseudo-random codes. The first or high speed contains 10 code bits. Each bit of the ten bit code consists of a ten nanosecond pulse. In the example herein illustrated, the 10 bit code comprises three successive positive 10 nanosecond pulses followed by two negative 10 nanosecond pulses, four positive 10 nanosecond pulses, and a negative 10 nanosecond pulse. This first code repeats continuously. Since each of the pulses of the first code are 10 nanoseconds wide, they are equivalent to 5 feet of range. Because there are 10 pulses in this first code, each pulse is unambiguous for 5 feet within 50 feet. This first code is coded by a second code. The second code is comprised of 100 nanosecond pulses, and modulates the first code so as to permit the first code either to be inverted or pass as originally generated. That is, the first code either remains as it was originally generated (+++ —-+++ —) or each bit of the 10 bit code is inverted (———++— ——+). The second code is comprised of 50 bits and is also repetitive. This second code resolves range ambiguities of 50 feet in every 2,500 feet and in conjunction with the first code resolves range unambiguously for 5 feet within 2,500 feet. In order to resolve range within approximately a 100 mile distance or 600,000 feet, a third code is required. This third code must resolve the 2,500 feet ambiguities, and this code requires 240 bits, derived by dividing 600,000 by 2,500 feet. The resultant coded signal is made up of the first code modulated by the second code and in turn modulated by the third code, and is transmitted by the transmitter, the details of which are not herein disclosed but comprise well-known apparatus and techniques which do not make up a part of this invention.

In the Figure, there is illustrated a typical processor for reducing received signals to derive therefrom range and doppler of detected targets. The input signals to the processor, which can be taken at the output of a mixer 10, are applied to a video amplifier 12 which amplifies both the negative and positive pulses of the received signal.

The signal output from video amplifier 12 taken at line 14 is then partly correlated or compressed, using passive correlation techniques, to remove the first code as follows: The signal is fed to a point 16 both directly via line 18 and through a series of delays 20 through 36, and a plurality of inverters 38 through 42. The delays 20 through 36, in the instant example, are each of ten nanoseconds duration to correspond to the time between successive pulses of the first code. The inverters 38 through 42, are as shown placed after delays 24, 26 and 36 corresponding to the fourth, fifth and tenth bits of the first code(those bits of opposite sense). The object of delays 20 through 36 and inverters 38 through 42, is to present at point 16 in the circuit a signal of substantial magnitude corresponding to the reception of the first code as reflected by a target. The bits of the code add up one atop the other to form a 10 nanosecond pulse approximately 10 times the voltage of one bit, but only one bit in length. The signal at point 16 is then fed to a plurality of range gates 44 through 62 by way of a series of delays 64 through 80. Delays 64 through 80 are in the instant example again ten nanoseconds long equivalent to the time between successive pulses of the first code or to 5 feet of range. Range gates 44 through 62 are operated by a range gate generator 82 which opens the gates for 10 nanoseconds duration during each 100 nanoseconds time interval. An output from any of range gates 44 through 62 indicates detection of a target which is resolved to be within a specific five feet within a 50 foot range interval.

The outputs from range gates 44 through 62 are then expanded in a series of stretch networks 84 through 102. There is one stretching network coupled to the outputs of each range gates 44 through 62. The stretching networks stretch the ten nanosecond pulses by a factor of ten producing long 100 nanosecond pulses. Reducing the bandwidth in this manner permits the use of active correlation techniques to remove the second code. (Of course, if desired, passive correlation could be again employed). Coupled to each of the range gate outputs, via the stretch networks 84 through 102, is a plurality of phase inversion switches $108_1 - 108_{10}, 110_1 - 110_{10}, 112_1 - 112_{10}$. The number of groups of switches correspond to the number of bits in the second code, thus, in the instant example 50 groups of phase inversion switches are employed. One phase inversion switch from each group is coupled to each stretch network, requiring in total 500 switches. Phase inversion switches $108_1, 110_1 \ldots 112_1$ are coupled to stretch network 84. Phase inversion switches $108_2, 110_2, \ldots 112_2$ are coupled to stretch network 86, etc. . . . . These phase inversion switches are also coupled to selective stages of a shift register 104. Ten phase inversion switches $108_1, - 108_{10}$ are coupled to stage 1 of shift register 104, ten phase inversion switches $110_1 - 110_{10}$ are coupled to stage 2 of shift register 104, and likewise right down the line through the stages of the shift register, including 10 phase inversion switches $112_1 - 112_{10}$ being coupled to stage 50 of shift register 104.

The number of stages of the shift register correspond to the number of bits in the second code, which in the instant example is 50. Shift register 104 is driven by a clock arrangement 106 which operates at the rate of the second code, here being 10 megacycles. This operation produces at the outputs of the phase inversion switches 108, 110 . . . 112 an intermediate range resolution equivalent to 5 feet within 2,500 feet.

The outputs from the phase inversion switches 108, 110 . . . 112 are applied to the horizontal row wires H1–H500 of an orthogonal storage matrix 114. One horizontal row wire is coupled to each phase inversion switch such that the matrix comprises 500 horizontal row wires. The matrix has 2,000 vertical column wires V1–V2000 and includes one magnetic core 116 coupled to each intersection of a horizontal row wire H with a vertical column wire V, thus providing for the storage of one million bits of data. Although matrix 114 is described as having a capability of handling 500 signal trains, this is only for illustration purposes, and more or less signal trains could be handled by merely adding or subtracting a proportional number of horizontal rows. Each core 116 is coupled to a particular vertical column V1–V2000 of the matrix. The selection of 2,000 vertical columns is illustrative only, and the number of columns can be increased in proportion to the degree of correlation gain desired.

A signal will be stored (written onto a core 116) when the core is simultaneously excited by an input onto a horizontal row wire H and a write pulse from a sequencer 118 onto the respective vertical column V. The function of the sequencer is to provide write pulses to the vertical column wires in a serial fashion at the rate of the incoming signals and could comprise a simple pulse generator and shift register arrangement. The means 120 for gaining the proper level of signal to be written onto the cores are well-known and are not shown in detail, but could comprise amplifiers, limiters, etc. Reference may be had to a patent application of Martin R. Richmond, et al, for "Signal Correlation Apparatus", Ser. No. 486,140, filed Sept. 9, 1965, now U.S. Pat. No. 3,496,544, and assigned to the assignee of this application, wherein such equipment is discussed in detail.

The information written onto the cores 116 of storage matrix 114 represent resolution of range of 5 feet within 2,500 feet. A 5 foot range gate is represented on each horizontal line of core matrix 114, for example, on horizontal line H1 it is the first 5 feet in 2,500 feet, on line H2, it is the range from 5 feet to 10 feet in the same 2,500 foot element, up to the maximum range of the radar, which, in the instant example, is 600,000 feet or roughly a hundred miles. This information is stored within core matrix 114 and it can be quickly read out into a correlator.

A correlator 132 is coupled to the vertical columns of storage matrix 114 and comprises a multiplicity of stitch networks 122 of magnetic cores 124 so wired stitched by a corresponding multiplicity of stitch wires 126 so as to recognize signals applied thereto. The cores 124 of the stitch networks 122 of correlator 132 are stitched in such a manner as to algebraically sum the signals to be recognized to thus produce a maximized output signal from a stitch network when the signal to be recognized is applied thereto. In the preferred embodiment the magnetic cores are small toroidal cores having normal linear transformer magnetic characteristics. Since core switching is not necessary in the stitch networks, vertical driving amplifiers, as well as reverse current drivers can be eliminated. Although toroids are illustrated as the preferred element, any element having multi-level characteristics could be employed with appropriate engineering modifications well known to those skilled in the art.

In a co-pending application of Daniel Blitz et al, for a "Signal Correlator" Ser. No. 626,164, filed Mar. 27, 1967, and assigned to the assignee of this application, a method of stitching core networks to recognize signals applied thereto is discussed in detail.

The horizontal rows H1–H500 of storage matrix 114 are sequentially read out by a read-out sequencer 128 and the signals applied to correlator 132. When a substantially large read-out pulse is applied to a horizontal row wire, the magnetic cores in the particular row which have been previously energized and placed in a 1 state are de-energized and placed back in a 0 state. This is a destructive read-out, which causes pulses to appear on appropriate vertical drive wires. These pulses are then summed by the stitch networks 122. Magnetic cores that had been in a 0 state (not energized by incoming signals) are unaffected by the read-out pulse, and no signal appears on those vertical wires. In the event that the characteristics of a signal derived from the horizontal row wires coincide with a particular stitch, a maximized signal output from the particular stitch network will be obtained. A large pulse will appear at an output 130 for a correct signal (in range, doppler and doppler phase) and noise for all other targets at different ranges and targets.

The cores 124 of stitch networks 122 are threaded or stitched by stitch wires 126 so that they will correlate with particular signals applied thereto. The cores of the stitch networks are wired in positive fashion to correlate positive portions of the signals to be recognized and in negative fashion to correlate negative portions of the signals to be recognized. The stitch networks are arranged so that the cores will simulate the transmitted third code modified from said transmitted third code by time delay for range and by phase inversion at the proper intervals for the doppler effect on the code.

The number of stitch networks 122 required in a particular correlator 132 is dependent upon the possible number of range and doppler combination which can be expected. For example, in the instant embodiment the number of 2,500 feet range increments to cover the required 600,000 feet is 240. This 240 must be multiplied by the number of different dopplers which are to be recognized, which in the instant example is 100. That is, each stitching represents a different range and a different doppler or a combination of range and doppler, all of them different, some with different ranges in the same doppler and some with different dopplers in the same range.

Now, because each horizontal row wire H can be read off rapidly into the same code and doppler stitching, the code that has been stitched into the stitch network will determine unambiguous range for any of the 500 horizontal lines in the matrix. So, for example, at 1 microsecond for readout time, of a horizontal line, it only takes 500 microseconds to read out into the matrix and determine all the ranges and dopplers that will be in a hundred mile range integral with 5 foot range resolution and a hundred cycle doppler resolution. The signal coming into the storage matrix must be read in at the rate that the third code was put on, so that each bit in the storage matrix has the polarity of the code bit it should have coming in, should there be a target of proper range. In order to synchronize for the doppler signals, the code must be read in at the rate of the third code, and for the intergration time which is required by the doppler resolution. For instance, if the read-in occurs at a 100 kc rate and a 1 millisecond intergration time is required, one hundred vertical lines would have to be read in.

In the instant example, the read-in occurs at a 200 kc rate with 10 milliseconds intergration time, so there are 2,000 vertical lines, and 2,000 bits of code and doppler on each horizontal line. Now, the length of the code doesn't have to be 2,000 bits. The code only has to be as long as you desire the unambiguous range, or that is, what your maximum unambiguous range is. For example, if the maximum range is roughly 600,000 feet with ambiguities at every 2,500 feet (600,000 divided by 2,500 is 240) a code of only 240 bits is required.

This system has a correlation gain of roughly 60 db (1 million bits correlating into a single bit).

Although the invention has been described as it relates to a pulse doppler radar system, this is not intended to limit its applicability. The concepts disclosed are applicable to numerous signal processing applications which will be suggested to those skilled in the art. Thus, it is to be understood that the embodiments shown are illustrative only, and that many variations and modifications may be made without departing from the principles of the invention herein disclosed and defined by the appended claims:

What is claimed is:

1. A signal processor for processing signals made up of more than one code, comprising:
    input means;
    means coupled to said input means for partly correlating the signals to correlate all but one code;
    means for storing said partly correlated signals; and
    a signal correlation network coupled to said storage means for correlating said partly correlated signals.

2. A signal processor as defined in claim 1, in which said partial correlation means includes:
    a passive network of a first plurality of series connected delay lines equal to the number of bits in the code to be removed less one;
    a plurality of inverters coupled to selected ones of said delay lines and/or input means;
    a second plurality of series connected delay lines equal to the number of bits of the code to be removed less one, coupled to said input means, to said inverters and to the non-selected first series of delay lines;
    a plurality of gates equal to the number of bits in the code to be removed, one each of said gates being coupled to said input means and to said second plurality of delay lines; and
    means for opening said gates for a preselected time period.

3. A signal processor as defined in claim 2, in which said first and second plurality of delay lines are each of a duration corresponding to the time between successive pulses of the code to be correlated.

4. A signal processor as defined in claim 2, in which said selected ones of said delay lines and/or input means correspond to opposite sense bits of the code to be correlated.

5. A signal processor as defined in claim 2, in which said preselected time period is equal to the pulse width of a pulse in said code to be correlated.

6. A signal processor as defined in claim 1, in which said correlation means includes:
    a shift register;
    a clock coupled to the input to said shift register; and
    a plurality of groups of phase inversion switches, each group coupled to a selected tap of said shift register, with outputs from said phase inversion switches being coupled to said storage means.

7. A signal processor as defined in claim 6, in which said shift register has a plurality of taps equal to the number of bits of the code to be correlated.

8. A signal processor as defined in claim 1, in which said means for storing said partly correlated signals includes:
    an orthogonal storage matrix comprising a multiplicity of bi-stable logic elements arranged in rows and columns, an electrical conductor connected to the bi-stable logic elements of each row of bi-stable logic elements, an electrical conductor connected to the bi-stable logic elements of each column of bi-stable logic elements; and
    means for applying said partly correlated signals to said orthogonal storage matrix.

9. A signal processor as defined in claim 8, in which said means for applying said partly correlated signals to said orthogonal storage matrix includes means for sequentially applying write pulses to the conductors connecting said columns of bi-stable logic elements simultaneously with the application of said partly correlated signals to the conductors connecting said rows of bi-stable logic elements, said write pulses being applied at the rate at which said one code was generated.

10. A signal processor as defined in claim 9, in which said bi-stable logic elements are magnetic cores.

11. A signal processor as defined in claim 1, in which said signal correlation network includes a multiplicity of networks of multi-level elements each network of elements grouped to sum substantially all of a multiplicity of simultaneously presented pulses representing the polarity characteristics as a function of time of a particular signal only.

12. A signal processor as defined in claim 11, in which said multi-level elements are toroids having linear transformer magnetic characteristics.

13. In a pulse doppler radar system in which the transmitted signal is comprised of a first code modulated by at least one other code, each code representing different size range intervals, a receiver signal processor, comprising:
    input means;
    means coupled to said input means for partly correlating received target reflected signals to remove all but one code, thus acquiring fine range resolution in one broad ambiguous range interval;
    means for storing said partly correlated signals; and
    a signal correlation network coupled to said storage means for correlating said partly correlated signals.

14. A signal processor as defined in claim 13, in which said partial correlating means includes a network comprising:
    a first plurality of series connected delay lines equal to the number of bits in said first code less one;
    a plurality of inverters coupled to selected ones of said delay lines and/or input means which correspond to opposite sense bits of said first code;
    a second plurality of series connected delay lines equal to the number of bits of said first code less one, coupled to said input means, to said inverters and to the non-selected first plurality of delay lines;
    a plurality of gates equal to the number of bits in said first code, one each of said gates being coupled to said input means and to said second plurality of delay lines; and means for opening said gates for a period of time equal to the width of one of said first code bits.

15. A signal processor as defined in claim 14, in which said partial correlation means includes additional networks, one for each code in the transmitted signal less two.

16. A signal processor as defined in claim 13, wherein said partly correlated signals represent range resolved in a single ambiguous range interval modulated by doppler and in which said storing means includes:
an orthogonal storage matrix comprising a multiplicity of bi-stable logic elements arranged in rows and columns, an electrical conductor connected to the bi-stable logic elements of each row of bi-stable logic elements, an electrical conductor connected to the bi-stable logic elements of each column of bi-stable logic elements; and
means for applying said partly correlated signals to said orthogonal storage matrix.

17. A signal processor as defined in claim 13, in which said signal correlation network includes a multiplicity of networks of multi-level elements, each network of elements grouped to sum substantially all of a multiplicity of simultaneously presented pulses representing the polarity characteristics as a function of time of a particular signal only.

18. A signal processor as defined in claim 13, in which signal correlation network includes a plurality of stitching networks of multi-level elements so stitched as to respond to only a particular range-doppler combination.

19. A signal processor as defined in claim 18, in which said multi-level elements are toroids having linear transformer magnetic characteristics.

20. A method for resolving range and doppler of received target signals after transmitting a signal comprising a first code modulated by one or more codes, comprising the steps of:
partly correlating the received signals to remove all but one code;
storing the partly correlated signals; and
correlating the stored signals with predetermined programs representing various range and doppler combinations.

* * * * *